United States Patent
Zhao et al.

(10) Patent No.: US 6,709,787 B2
(45) Date of Patent: Mar. 23, 2004

(54) POLYCARBON SULFIDE, PROCESS FOR PREPARING THE SAME AND NONAQUEOUS ELECTROLYTE BATTERY COMPRISING THE SAME

(75) Inventors: Jinbao Zhao, Ibaraki (JP); Shoko Ibuki, Ibaraki (JP); Hideki Nishihama, Ibaraki (JP); Ryo Nagai, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 45 days.

(21) Appl. No.: 09/779,735

(22) Filed: Feb. 9, 2001

(65) Prior Publication Data

US 2001/0033971 A1 Oct. 25, 2001

(30) Foreign Application Priority Data

| Feb. 9, 2000 | (JP) | 2000-031305 |
| Jun. 23, 2000 | (JP) | 2000-189056 |
| Aug. 11, 2000 | (JP) | 2000-243569 |
| Sep. 8, 2000 | (JP) | 2000-272531 |
| Sep. 8, 2000 | (JP) | 2000-272600 |
| Jan. 15, 2001 | (JP) | 2001-006065 |

(51) Int. Cl.$^7$ ................................................ H01M 4/60
(52) U.S. Cl. ................ 429/213; 429/231.8; 429/212
(58) Field of Search .................... 429/213, 231.8, 429/212

(56) References Cited

U.S. PATENT DOCUMENTS

| 4,410,609 A | 10/1983 | Peled et al. |
| 4,739,018 A | 4/1988 | Armand et al. |
| 4,742,127 A | 5/1988 | Armand et al. |
| 4,803,249 A | 2/1989 | Armand et al. |
| 4,833,048 A | 5/1989 | Dejonghe et al. |
| 5,441,831 A | 8/1995 | Okamoto et al. |
| 5,523,179 A | 6/1996 | Chu |
| 5,919,587 A * | 7/1999 | Mukherjee et al. ......... 429/213 |
| 6,402,795 B1 * | 6/2002 | Chu et al. .................. 29/623.5 |

FOREIGN PATENT DOCUMENTS

| JP | 57145272a | 9/1982 | |
| JP | 5067477 A | 3/1993 | |
| JP | 06275313 A * | 9/1994 | .......... H01M/10/36 |
| WO | 8501293 A1 | 3/1985 | |
| WO | 9106132 A1 | 5/1991 | |
| WO | 9641387 A1 | 12/1996 | |
| WO | 9641388 A1 | 12/1996 | |

* cited by examiner

*Primary Examiner*—Carol Chaney
(74) *Attorney, Agent, or Firm*—Birch, Stewart, Kolasch & Birch, LLP

(57) ABSTRACT

By eliminating a part of sulfur atoms of the polysulfide segment of the formula: —$S_m$— (m≧3) of an organic sulfur compound, a carbon polysulfide is synthesized, which comprises carbon and sulfur as constitutive elements and contains at least 67 wt. % of sulfur and at least 95 wt. % of carbon and sulfur in total, and which has a disulfide linkage formed by most of the sulfur atoms in the molecule and also has a highly uniform structure. A nonaqueous electrolytic battery which has a high capacity and shows a small decrease in capacity in association with cyclic charge and discharge is provided using this carbon polysulfide as an active material for the positive electrode.

2 Claims, 7 Drawing Sheets

POLYCARBON SULFIDE, PROCESS FOR PREPARING THE SAME AND NONAQUEOUS ELECTROLYTE BATTERY COMPRISING THE SAME

FIELD OF THE INVENTION

The present invention relates to a polycarbon sulfide usable as an active material for a battery, a process for preparing the same and a nonaqueous electrolytic battery comprising the same.

BACKGROUND OF THE INVENTION

With the rapid expansion of portable electronic devices on the market, batteries to be used as power supplies thereof are more severely demanded to have higher performance. Besides, the development of batteries, which are more friendly to the global environment, is required. Under such circumstances, sulfur and its derivatives, which have a higher capacity, are more cost effective and give less loads on the environment, are expected to be promising as active materials for the positive electrodes of nonaqueous electrolytic batteries (primary batteries or secondary batteries).

If it is possible to utilize the two electron reaction of sulfur for a battery, sulfur will be an active material having an energy density as high as 1675 mAH/g theoretically. However, since sulfur is highly insulating and poor in reversibility, alkali metal-sulfur batteries have low capacity factors in practical use in the present state of art. In addition, the alkali metal-sulfur batteries can be used only under high temperature atmospheres, which leads to the corrosion of battery cases and the like due to the high activity of sulfur or its derivatives. Thus, it is hard to apply such batteries to miniature batteries for use in appliances.

In the meantime, inorganic sulfur compounds soluble in organic solvents, such as the sulfides of alkali metals are also used as active materials for the positive electrodes of batteries (see JP-A-57-145272, etc.). Porous carbon electrodes are used as the positive electrodes of batteries using the above inorganic sulfur compounds. These batteries are able to discharge at a larger quantity of current than the conventional sulfur batteries, but they are used mainly as primary batteries because carbon composing the electrodes is subject to deterioration during the discharge.

Further, organic sulfur compounds comprising carbon, sulfur, etc. as main constitutive elements have been investigated in possibility of usage as active materials for positive electrodes. For example, WO85/01293 (corresponding to JP-A-60-502213) proposes an organic sulfur compound represented by the formula: $(R_a CS_b)_b$ wherein R is a hydrogen, an alkali metal or a transition element. The present inventors have examined the syntheses of the organic sulfur compounds disclosed in the same publication and found that they have the following problems.

That is, it is impossible to perfectly substitute halogen atoms or hydrogen atoms with sulfur atoms in the synthesis by adding sulfur to a polymer such as a halogenated polyethylene (e.g. polytetrafluoroethylene, polytrifuluorochloroethylene or the like) or polyacetylene. Therefore, the resultant organic sulfur compounds tend to have many halogen atoms, hydrogen atoms or the like remaining in the molecules. In addition, it is impossible to control the amount of sulfur to be added, and therefore, it is very difficult to produce a compound having an uniform structure. This problem is manifest from the facts that the organic sulfur compounds synthesized in Examples 1 to 3 and 7 in WO85/01293 contain many elements other than carbon and sulfur.

Example 6 of WO85/01293 describes a product of the composition formula: $CS_{0.98}H_{0.009}$, which is composed of substantially two kinds of elements, i.e., carbon and sulfur. The present inventors have carefully examined the product and found that the synthesis described in Example 6 affords a mixture of an organic sulfur compound having a low sulfur content and a polysulfide compound. Since the polysulfide compound can not be removed by washing with water, it seems that the composition formula of the product described in Example 6 expresses an average composition of the above mixture, as a matter of fact. In addition, since the polymer containing no unsaturated bond is used as the starting material, the carbon backbone of the synthesized organic sulfur compound having a low sulfur content is essentially a carbon chain with saturated bonds, and further, since the number of the disulfide linkages (C—S—S—C) with the carbon backbone present in the molecule is small, such an organic sulfur compound has difficulties in reversible charge and discharge, and also has poor discharge capacity. In other words, it is impossible that the synthesis described in WO85/01293 affords an organic sulfur compound consisting of two kinds of elements, i.e., carbon and sulfur and having a high capacity and a high sulfur content.

As another type of compound, an organic sulfur compound represented by the formula: $(CS_w)_p$ wherein w is a number of 2.5 to about 50, and p is a number of 2 or more attracts attentions because the compound has an energy density as high as 1000 to 1600 mAh/g. Skotheim et al. use this compound as an active material for the positive electrode of a nonaqueous electrolytic battery and propose a secondary battery capable of having a high capacity at room temperature (see U.S. Pat. No. 5,441,831 (corresponding to JP-A-7-29599), WO96/41388 (corresponding to JP-A-11-506799), WO96/41387 (corresponding to JP-A-11-514128), etc.). This organic sulfur compound can be produced by any of the following methods: a method comprising reacting sodium sulfide with sulfur, followed by a reaction with an organic chloride compound; and a method comprising reacting acetylene with sulfur in a solution of metal sodium in ammonia; other is by reacting carbon disulfide with dimethylsulfone in the presence of metal sodium as a catalyst. This organic sulfur compound is characterized in that the molecular structure has a backbone having a conjugated structure formed mainly by carbon atoms and a structure represented by the formula —$S_m$— ($m \geq 3$) (hereinafter referred to as polysulfide segment) bonded to the backbone.

However, it is impossible to design the molecule of the above organic sulfur compound of the formula: $(CS_w)_p$ in the course of the synthesis, and therefore, it is difficult to control the sulfur content of the resultant compound. Thus, there remains a problem in that organic sulfur compounds having uniform structures can not be obtained.

Further, the produced compounds usually contain a large amount of polysulfide compounds having low or high molecular weights, and such a tendency is observed that, as the value of p in the formula: $(CS_w)_p$ increases, the ratio of the above conjugated structure decreases and the ratio of the polysulfide compound increases. Particularly in case of a battery using an electrolytic solution (liquid electrolyte), the polysulfide compound or the polysulfide segment in the molecule of the above organic sulfur compound is decomposed in the course of charge and discharge and easily dissolved in the electrolytic solution, which results in the significant factors of lowering the stability of the compound and the stability of the battery comprising such a compound. As a result, the self-discharge of the compound itself becomes relatively large, and further, a metal sulfide which inhibits the reversibility of charge and discharge is formed, so that the cyclic life of the battery becomes shorter.

DISCLOSURE OF THE INVENTION

The first object of the present invention is to provide a polycarbon sulfide which has high reversibility and high capacity as an active material for electrodes and also has excellent stability.

The second object of the present invention is to provide a process for preparing the above specified excellent polycarbon sulfide.

The third object of the present invention is to provide a high-capacity nonaqueous electrolytic battery which is excellent in cyclic charge and discharge performance and reliability, using such an excellent polycarbon sulfide as an active material.

The present inventors have intensively researched in order to achieve the above objects, and found out a process for preparing a novel organic sulfur compound (polycarbon sulfide) from an organic sulfur compound comprising carbon and sulfur as constitutive elements and polysulfide segments, and the resultant compound substantially consists of two kinds of elements, i.e., carbon and sulfur and has a higher sulfur content and a higher uniformity in the molecular structure than the conventional organic sulfur compounds. The present invention is accomplished based on such a finding.

According to the first aspect of the present invention, there is provided a polycarbon sulfide comprising carbon and sulfur as constitutive elements and contains at least 67 wt. % of sulfur and at least 95 wt. % of carbon and sulfur in total, characterized in that a main peak appears at or around 1444 cm$^{-1}$ of a Raman shift in a Raman spectrum thereof, and that a peak within the range of 400 cm$^{-1}$ to 525 cm$^{-1}$ appears substantially only at or around 490 cm$^{-1}$.

According to the second aspect of the present invention, there is provided a polycarbon sulfide comprising carbon and sulfur as constitutive elements and contains at least 67 wt. % of sulfur and at least 95 wt. % of carbon and sulfur in total, characterized in that, in the X-ray diffraction with the CuKα ray, the diffraction pattern in the range of diffraction angle (2 θ) of 20° to 30° is shown substantially only by a broad diffraction peak having a peak at or around 25°.

According to the third aspect of the present invention, there is provided a polycarbon sulfide comprising carbon and sulfur as constitutive elements and contains at least 67 wt. % of sulfur and at least 95 wt. % of carbon and sulfur in total, characterized in that a decrease in weight, measured by the thermogravimetric analysis, is 5% or less when the compound is heated at a heating rate of 10°/min. from room temperature to 300° C.

A polycarbon sulfide which comprises carbon and sulfur as constitutive elements and contains at least 67 wt. % of sulfur and at least 95 wt. % of carbon and sulfur in total, and which also has the above specified physical properties shows high capacity, high reversibility and a small decrease in capacity in association with cyclic charge and discharge when used as an active material for the electrode of a nonaqueous electrolytic battery. Therefore, the polycarbon sulfide of the present invention can provide a primary battery or a secondary battery with high reliability.

For example, the above polycarbon sulfide may be synthesized from an organic sulfur compound which comprises carbon and sulfur as the constitutive element and has a polysulfide segment represented by the formula: —S$_m$— (m≧3) by eliminating a part of sulfur atoms composing the polysulfide segment, and converting the polysulfide segment into a disulfide linkage.

Further, the above polycarbon sulfide compound can be used as not only an active material for a nonaqueous electrolytic battery as exemplified above but also, for example, other electrochemical devices such as a capacitor, data memory devices, display devices and electronic materials.

DETAILED DESCRIPTION OF THE INVENTION

Figure 1:
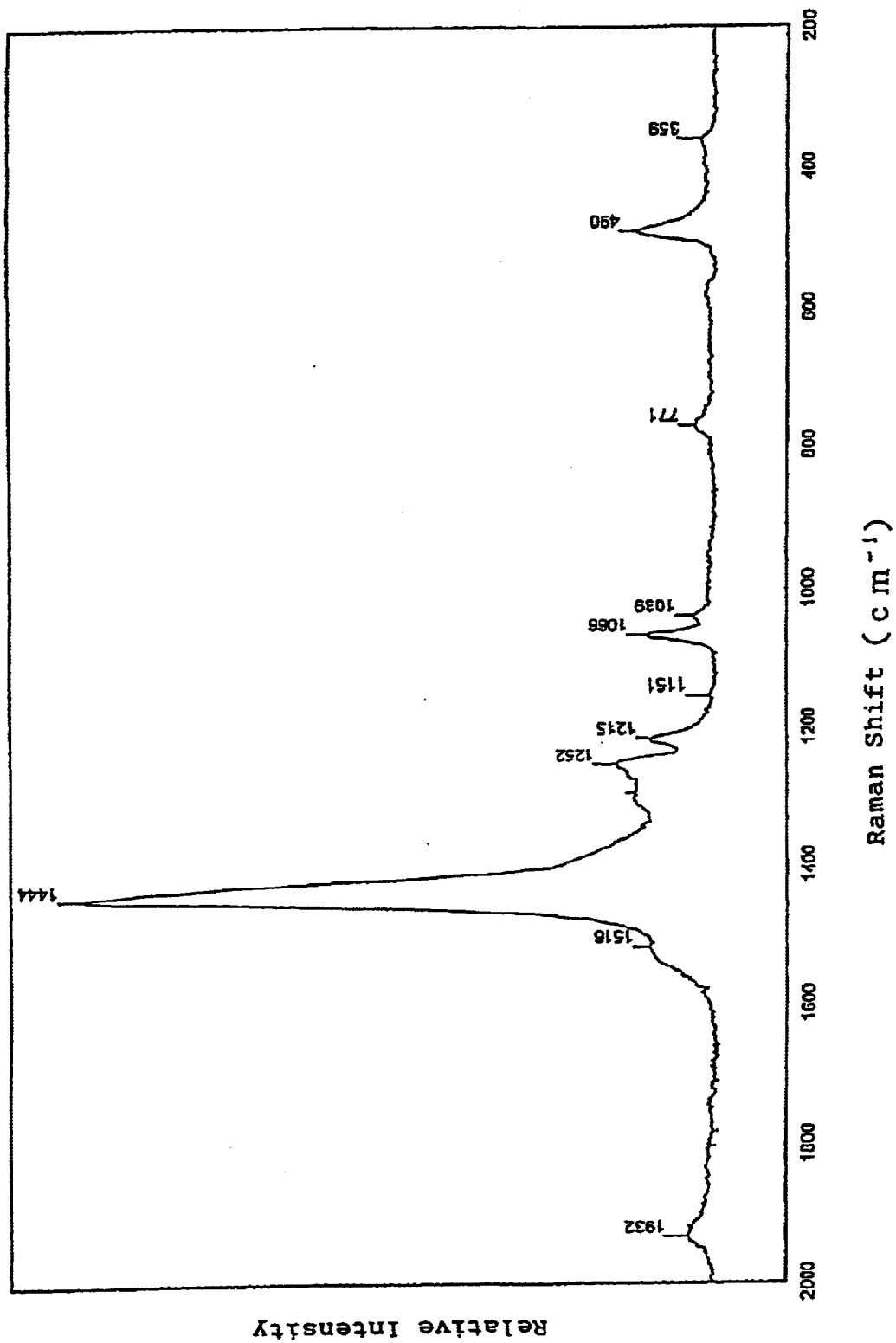
FIG. 1 shows the Raman spectrum of a polycarbon sulfide (CS$_{1.06}$)$_n$ prepared in Example 1.

Hereinafter, a process for preparing a polycarbon sulfide according to the present invention and the usage of the carbon sulfide as an active material for a nonaqueous electrolytic battery will be described in more detail.

The polycarbon sulfide which comprises carbon and sulfur as constitutive elements and contains at least 67 wt. % of sulfur and at least 95 wt. % of carbon and sulfur in total and which has the above specified physical properties is synthesized, for example, by the following process.

Firstly, an alkali metal sulfide such as sodium sulfide and sulfur are reacted in a solvent (for example, alcohol, acetone, water or the like) at a temperature of about 0 to about 50° C. for about 10 minutes to about 10 hours, and the solvent is evaporated in vacuum to obtain a reaction product. Then, the reaction product is reacted with a unsaturated halohydrocarbon (for example, hexachlorobutadiene or the like) in an organic solvent (for example, N-methyl-2-pyrrolidone or the like) at a temperature of about 0 to about 50° C. for about 10 minutes to about 3 hours. After that, the resultant reaction product is washed several times with pure water and an organic solvent and dried at a temperature of about 10 to about 80° C. in vacuum to produce a brown solid compound as an intermediate. The brown solid compound has a lot of polysulfide segments in the molecule, and it corresponds to the organic sulfur compound described in WO96/41387 (corresponding to JP-A-11-514128) or the like. Also, it is confirmed that the brown solid compound contains a large amount of a polysulfide compound which has been formed in the course of the synthesis reaction. As the method of preparing this intermediate besides the above method, any of the methods of synthesizing organic sulfur compounds known in the art may be employed.

Next, the above intermediate is charged in a heat-resistant vessel made of alumina or the like and heated in vacuum or under an inert atmosphere to evaporate impurities such as the polysulfide compound and the like contained in the intermediate and to break the polysulfide segments in the molecule of the organic sulfur compound so as to evaporate and eliminate unnecessary sulfur. Thus, a polycarbon sulfide is afforded, which substantially consists of two kinds of elements, i.e., carbon and sulfur and which allows most or all of the carbon atoms in the molecule to bond to the sulfur atoms and also allows most or all of the sulfur atoms to form disulfide linkages having high reversibility in the oxidation and reduction. The sulfur content in such a polycarbon sulfide is as high as at least two thirds in weight, that is, at least 67 wt. %.

The molecular structure of this compound will be more specifically described. It is inferred that the molecular structure has a repeating unit represented by the following formula (I), and it is also inferred that a disulfide linkage represented by the formula (II) is formed between the carbon chains.

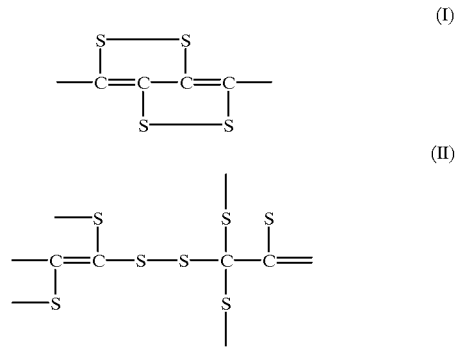

The presence of the carbon-carbon double bond (C=C) and the disulfide linkage (C—S—S—C) of sulfur atoms in the molecule of the above polycarbon sulfide can be confirmed by Raman analysis or the like described later.

It is preferable to carry out the above heat treatment under a heating atmosphere where an oxygen concentration is low, that is, in vacuum or under an inert gas atmosphere with a low oxygen concentration (for example, 400 ppm or lower) in order to prevent the oxidation of the compound under heating.

The heating temperature is preferably about 300 to about 430° C., more preferably 320 to 410° C. It is possible to carry out the heat treatment even at a still lower temperature if it is done in vacuum or under reduced pressure. The heating time may be adjusted according to the temperature for heat treatment and the heating atmosphere, and the adequate time is about 10 minutes to about 5 hours. The composition formulae of the resultant polycarbon sulfides slightly differ from one another because of the differences in the compositions of the intermediates, the heating temperatures and the heating time. However, the polycarbon sulfides easily can have higher capacity by containing at least 67 wt. % of sulfur. It is desirable in view of chemical stability that the contents of other elements than carbon and sulfur should be small. In other words, it is desirable that the total content of sulfur and carbon is at least 95 wt. %.

Further, the polycarbon sulfide in which x is a number of 0.9 to 1.5 with the atomic ratio of carbon atoms to sulfur atoms being 1:x, is preferable, since it can have high uniformity in molecular structure, it is excellent in reversibility in charge and discharge, and therefore, it can be used as an active material having high capacity. More preferably, x is 1.3 or less. Particularly when x is 1.1 or less, the ratio of the disulfide linkage which permits reversible charge and discharge becomes the highest, and therefore, such a compound can have a high capacity and excellent stability. The value of x is preferably at least 0.95 in view of the capacity, and the best compound can be obtained when x is at least 1. This is because, as x decreases, in addition to the disulfide linkages involved in charge and discharge, C—S—C linkages which do not contribute to the charge and discharge are introduced into the molecule. Furthermore, the compound in which x is larger than 1.5 has many polysulfide segments introduced into the molecule.

The above polycarbon sulfide may contain other elements such as hydrogen, nitrogen, boron and halogen, in addition to carbon and sulfur, to such an extent that the chemical stability and reversibility in charge or discharge of the compound are not sacrificed, although it is desirable that the polycarbon sulfide consists of two kinds of elements, that is, carbon and sulfur. For example, when the chemical composition of the compound is represented by the formula: $(CS_x)_n$ a compound of this formula in which x is 0.9 to 1.5 and in which the value of n is 4 or more is desirable. It is difficult to synthesize a polycarbon sulfide having a disulfide linkage when the value of n is 3, or even if synthesized, such a compound may be poor in stability and less useful. The polycarbon sulfide of the present invention is excellent in resistance to organic solvents and the like, and thus it is difficult to measure its molecular weight. Therefore, it is hard to precisely determine the value of n in the above formula. Any way, the value of n is preferably 4 or more, and more preferably 100 or more in view of processability. Although the upper limit of the value of n is not particularly restricted, normally, it is expected that a compound of the above formula in which the value of n is up to about 100,000 can be readily synthesized. The polycarbon sulfide of the above formula in which the value of n is 4 or more can be synthesized using, for example, a halogenated unsaturated hydrocarbon of which the backbone has 4 or more carbon atoms.

Apart from the foregoing methods, the above polycarbon sulfide can be prepared by allowing an organic sulfur compound having polysulfide segments in contact with a non-aqueous solvent or the vapor thereof in a vessel, thereby eluting the sulfur segments which are not bonded to the carbon backbone and other impurities and also breaking and eliminating the unstable and long sulfur segments bonded to the carbon backbone. That is, the organic sulfur compound having the polysulfide segments is changed into a polycarbon sulfide which substantially consists of two kinds of elements, i.e., carbon and sulfur, and primarily has a structure of the above formula (I), by the contact with the above non-aqueous solvent. This extraction with the solvent is preferably carried out under an atmosphere where the oxygen concentration is low, more preferably under an inert gas atmosphere where the oxygen concentration is decreased to 400 ppm or lower, giving care to the flashing point of the solvent.

It is preferable that the solvent to be used for the solvent extraction is a nonaqueous organic solvent having excellent solubility in a sulfur compound having sulfur- or polysulfide segments. Particularly, in order to break and eliminate the unstable and long sulfur segments linked to the carbon backbone, preferably the solvent is a nonaqueous organic solvent having a strong donor property. Specific examples of such a solvent include aromatic solvents such as toluene, benzene, etc.; aliphatic or alicyclic low molecular weight solvents containing oxygen or nitrogen in the molecule, such as tetrahydrofuran, dimethylformamide, tetramethylethylenediamine, dioxolane, tetraglyme, etc.; sulfur-containing solvents such as carbon disulfide, dimethylsulfoxide, sulfolane, etc.; and so on. In addition, the mixtures of the above solvents also may be used. Among those solvents, dimethylsulfoxide, carbon disulfide, tetrahydrofuran, toluene, tetraglyme and the like are preferably used. In this regard, the tetraglyme as referred to above is an organic solvent named bis[(2-methoxyethoxy)ethyl] ether.

The temperature for the above extraction using the solvent is not particularly restricted, and it is from room temperature to the boiling point of the solvent. Particularly preferably, the extraction is carried out while refluxing the solvent. The extraction time varies depending on the temperature and the molecular weight of the organic sulfur compound as the intermediate, and it is adequately from about 10 minutes to about 5 hours. The higher the temperature and the lower the molecular weight of the intermediate, the shorter the extraction time becomes.

The Raman analysis of the above polycarbon sulfide is conducted using an argon laser as a light source. According to the results of the Raman analysis, the main peak appears at or around 1444 $cm^{-1}$ of the Raman shift in the resulting Raman spectrum, and substantially only one peak appears at or around 490 $cm^{-1}$ within the range of 400 $cm^{-1}$ to 525 $cm^{-1}$. The main peak at or around 1444 $cm^{-1}$ is assigned to the unsaturated bond (C=C bond) of carbon atoms in the carbon backbone, and this peak has the maximal intensity in the Raman spectrum. In the range of 400 $cm^{-1}$ to 525 $cm^{-1}$, the peaks assigned to the disulfide linkages bonded to the carbon backbone or the peak assigned to the polysulfide segments appears. However, the peak at or around 490 $cm^{-1}$ is assigned to the disulfide linkage, and the peak assigned to the S—S bonds in the polysulfide segments appears at a different position. The phrase "substantially only one peak at or around 490 $cm^{-1}$" referred to in the present invention means that very small peaks other than the peak at or around 490 $cm^{-1}$ may be present. That is, the polycarbon sulfide of the present invention desirably has no polysulfide segment in the molecule. In other words, it is desirable that there is no peak other than the peak at or around 490 $cm^{-1}$ within the above range on the Raman shift. However, this means that the polycarbon sulfide may contain a small amount of polysulfide segments in the molecule to an extent that the required properties are not deteriorated.

The wording "at or around 1444 $cm^{-1}$" referred to herein means the range of 1444 $cm^{-1} \pm 20$ $cm^{-1}$ and the wording "at or around 490 $cm^{-1}$, the range of 490 $cm^{-1} \pm 20$ $cm^{-1}$.

Many peaks overlapped on one another are observed in the ranges of 400 $cm^{-1}$ to 525 $cm^{-1}$ in the Raman spectra of the conventional sulfur compounds. This means that a lot of polysulfide segments represented by the formula: —$S_m$— (m≧3) are present in the molecule, and it is estimated that m indicates various values. In the meantime, the peak at or around 490 $cm^{-1}$ is indefinite, and thus it is estimated that there is substantially no disulfide linkage in the molecule. While the conventional organic sulfur compounds show a broad peak at or around 1444 $cm^{-1}$, the polycarbon sulfide of the present invention shows a sharp peak at this position, which proves that the polycarbon sulfide has the more uniform composition and structure.

When the above polycarbon sulfide is subjected to X-ray diffractometry using the CuKα ray, the diffraction pattern in the range of diffraction angle (2 θ) of 20 to 30° can be shown by substantially only one broad diffraction peak having a half value width of about 1.5° to about 5° which has a peak position at or around 25° (25°±3.5°). That is, substantially one diffraction peak appears in the above diffraction angle range. The wording "substantially" does not always mean that there is perfectly only one diffraction peak, but it means that, although it is desirable that peaks assigned to polysulfide segments, in other words, peaks identified by sulfur are not observed, peaks which, even though observed, are very weak (the peak intensity is about one tenth or less of that of the former peak) is acceptable in the present invention.

When the polycarbon sulfide is synthesized by the foregoing process, a halide of an alkali metal is produced as a by-product in the course of the production of the organic sulfur compound as the intermediate, and therefore, the resultant polycarbon sulfide may sometimes contain a small amount of sodium chloride and the like even if the intermediate or the finally produced polycarbon sulfide is washed. For this reason, in some cases, the peak of the halide of the alkali metal appears in the X-ray diffraction pattern, but this diffraction peak may be ignored.

It is assumed that the above peak at or around 25° may be a diffraction peak which is assigned to a layer structure that is formed as follows: planes formed by a disulfide linkage represented by the following formula are piled up to form the layer structure:

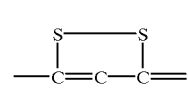

(III)

The peak has a broad shape because the backbone essentially composed of carbon atoms may be rotatable, so that all the respective planes formed by a plurality of disulfide linkages in one molecule may not be always arranged on the same plane, and because the molecular weight of the synthesized polycarbon sulfide has a specific distribution. Of course, this peak is not always perfectly one, but slight separation may occur for the foregoing reasons. However, substantially one peak as a whole is acceptable. The interlayer distance determined by the diffraction angle of this peak is about 0.3 to about 0.44 nm, which is close to the interlayer distance of graphite (0.335 nm). Accordingly, it is assumed that lithium may be intercalated between the layers of the above layer structure.

By contrast, the conventional organic sulfur compounds including the intermediates of the present invention show many peaks on the X-ray diffraction patterns, and almost all of those peaks are diffraction peaks assigned to the free sulfur atoms or the sulfur atoms of the polysulfide segments. The diffraction peaks assigned to elements other than the sulfur atoms are hard to distinguish because of their low intensities, and it is estimated that the conventional organic sulfur compounds having polysulfide segments may have lower crystallinity than the polycarbon sulfide of the present invention.

Further, when the conventional organic sulfur compound is subjected to thermogravimetric-differential thermal analysis (TG-DTA) under a nitrogen atmosphere, strong endothermic peaks assigned to the sulfur atoms appear at 122.7° C. and 314° C., and as the temperature increases, the weight of the compound decreases from at or around 200° C. However, in case of the polycarbon sulfide of the present invention, the above peaks at 122.7° C. and 314° C.

disappear, and the weight thereof does not decrease until the temperature is raised up to still higher temperature. For example, the polycarbon sulfide shows excellent thermal stability such that the weight loss is 5% or less, when heated at a rate 10° C./min. from room temperature to 300° C. Therefore, when the polycarbon sulfide having high crystallinity and high chemical stability according to the present invention is used as an active material for the positive electrode of a nonaqueous electrolytic battery, the resultant battery can maintain excellent reversibility over a long period of time, because the active material is inhibited from decomposing in association with charge and discharge, and because the elusion of the sulfur atoms into the electrolytic solution and the formation of sulfides in association with the decomposition of the active material are also inhibited.

The use of the polycarbon sulfide of the present invention as the active material for the positive electrode of the nonaqueous electrolytic battery leads to a theoretical capacity of about 550 to about 890 mAh/g, and thus makes it possible to achieve a capacity 4 times larger than that of $LiCoO_2$ (137 mAh/g), which is most widely used as the active material for the positive electrode.

Besides the use as the active material for the positive electrode of the nonaqueous electrolytic battery, it is expected that the polycarbon sulfide of the present invention is to be used as an active material for negative electrodes, or as data memory elements, display elements, electronic materials and the like, by taking advantage of the chemical stability, semiconductivity, light absorption, etc. of the polycarbon sulfide.

Next, a process for constructing a nonaqueous electrolytic battery (secondary battery) comprising the polycarbon sulfide of the present invention will be described.

The positive electrode is composed of the above polycarbon sulfide, and if necessary, a conducting aid, a binder, additives, etc. As the conducting aid, for example, carbonaceous materials such as graphite and carbon black and conductive polymers are preferably used. Particularly when the conductive polymer is contained, improvement on the performance of the battery under large current load can be expected.

Preferable examples of the conductive polymers include polymers having conjugated structures such as polyacene, polyacetylene, polyaniline and polypyrrol and the derivatives thereof having side chains such as methyl, butyl, benzyl or the like.

Examples of the binder include fluororesins such as polyvinylidene fluoride and polytetrafluoroethylene; amorphous polyether; polyacrylamide; poly N-vinylacetoamide; polyaniline soluble in a solvent; polypyrrol; copolymers of the monomers composing the above compounds; and compounds formed by the crosslinkage of the above polymers. It is preferable that the binder is a polymer compound which is chemically stable to the active materials for the positive electrodes and has strong adhesive force thereto.

Further, when the positive electrode comprises nickel, a nickel alloy, a nickel composite or a nickel compound as a constituent, the reversibility in charge and discharge of the positive electrode is improved because of the interaction with the polycarbon sulfide. Examples of the nickel alloy include $LaNi_5$, $LaNi_{4.6}Al_{0.4}$, V—Ti—Ni, etc. Examples of the nickel composite include composites of nickel and inorganic materials or organic materials such as nickel deposited on an aluminum foil, a stainless foil, etc.; nickel deposited on a polypropylene sheet, a polyethyleneterephthalate sheet, a polybutyleneterephthalate sheet, etc., and the like. Examples of the nickel compound include nickel sulfides such as NiS, $Ni_2S_2$, $NiS_2$ and the like, among which a nickel sulfide of the formula: $NiS_z$ (in which z is a number of 1 to 5) is preferably used. This is because this nickel compound is inferred to act also as an active material for the positive electrode.

The above nickel, nickel alloy, nickel composite or nickel compound is contained as an additive in the formulation of the positive electrode, and the content thereof in the formulation of the positive electrode is preferably 0.5 to 40 wt. %, more preferably 3 to 25 wt. %. In this case, the particle size is preferably 0.1 to 10 μm. In this regard, nickel functions also as an electron conductive material, and therefore, nickel may be used in combination with the above additive or instead of the additive. For example, a foam or a sheet of nickel may be used as a current-collecting material for the positive electrode, or a ribbon of nickel may be used as a lead. When nickel is used as the current-collecting material for the positive electrode, the cyclic charge and discharge performance of the battery can be improved, as compared with the use of aluminum as the current-collecting material for the positive electrode of a conventional nonaqueous electrolytic battery. When the outer package of the battery is used as an output terminal of the positive electrode, the outer package may be made of nickel, nickel alloy or a metal having a nickel plating layer thereon.

The positive electrode is constructed, for example, by the steps of adding, to the polycarbon sulfide as the active material for positive electrode, the above mentioned conducting aid, binder, etc., if necessary; mixing them to prepare a formulation for the positive electrode; dispersing the formulation in a solvent to form a paste (the binder may be beforehand dissolved in the solvent and mixed with the active material, etc.); and applying the paste containing the above formulation to a metal foil as a current-collecting material for the positive electrode and drying it, thereby forming a layer of the positive electrode formulation on at least a part of the current-collecting material for the positive electrode. However, the positive electrode is not always constructed by the above process, and it may be constructed by other process.

As the active material of the negative electrode, there are given alkali metals such as lithium and sodium; alkaline earth metals such as calcium and magnesium; alloys of these metals with aluminum or the like; carbonaceous materials such as graphite; elements capable of forming alloys with lithium, for example, tin, silicon, etc. or oxides containing such elements; lithium-containing nitrogen compounds; and conductive polymers including polymers having conjugated structures such as polyacene, polyacetylene, polyaniline, polythiophine, polypyrrol and the like, and derivatives thereof having side chains such as methyl, butyl, benzyl or the like.

The processes of constructing negative electrodes are roughly classified to two types, depending on the natures of active materials for negative electrodes. That is, in one process using a metal or an alloy as an active material for a negative electrode, the negative electrode is constructed by pressing the metal or the alloy as the active material to a current-collecting material composed of a porous metal body such as a wire mesh, expanded metal, punching metal or the like. In the other process using a carbonaceous material as an active material, the negative electrode is constructed by adding, to the above carbonaceous material as the active material, similar conducting aid, binder, etc. to those of the positive electrode, as required; mixing them to prepare a formulation for the negative electrode; dispersing the formulation in a solvent to form a paste (the binder may be previously dissolved in the solvent and mixed with the active material); and applying the paste to a copper foil as a current-collecting material for the negative electrode and drying it, thereby forming a layer of the formulation for the negative electrode on at least a part of the current-collecting material. However, the process for constructing the negative electrode is not limited to the foregoing processes, and it may be constructed by other process.

As the nonaqueous electrolyte, any of a liquid electrolyte (hereinafter referred to as "electrolytic solution"), a polymer electrolyte and a solid electrolyte may be used.

Regarding the electrolyte, firstly, the electrolytic solution is explained. The electrolytic solution is prepared by dissolving an electrolyte salt in a nonaqueous solvent component.

As the solvent component, ethers, esters, carbonates and the like are preferably used. It is particularly preferable to use esters having a high dielectric constant (30 or more) in combination. Examples of the esters with the high dielectric constant include ethylene carbonate, propylene carbonate, butylene carbonate, γ-butylolactone and sulfur-based esters such as ethyleneglycolsulphite; and the like. Among them, the cyclic esters are preferred, while the cyclic carbonates such as ethylene carbonate are particularly preferred.

Other than the above solvents, there can be used linear alkyl esters such as dimethyl carbonate, diethyl carbonate, methylethyl carbonate, vinylene carbonate and methyl propinate; linear phosphate triesters such as trimethyl phosphate; and the like. Besides, there can be used 1,2-dimethoxyethane, 1,3-dioxolane, tetrahydrofuran, 2-methyltetrahydrofuran, diethylether, tetraglyme and the like. Further, amine-based or imide-based organic solvents, and sulfur-containing organic solvents such as sulfolane, dimethylsulfoxide and the like may be used.

In some cases, the addition of a compound having C=C unsaturated bonds as an additive to the electrolytic solution is effective to inhibit the decrease of the cyclic performance. Examples of such a compound include aromatic compounds such as $C_6H_5C_6H_{11}$ (cyclohexylbenzene) and fluorinated compounds such as $H(CF_2)_4CH_2OOCCH=CH_2$ and $F(CF_2)_8CH_2CH_2OOCCH=CH_2$.

Preferable examples of the electrolyte salt to be dissolved in the above solvent component include halides or perchlorates of alkali metals such as lithium and sodium and alkaline earth metals such as magnesium; organic boron lithium salts; salts of fluorine-containing compounds such as trifluormethane sulfonate; imide salts and the like.

Specific examples of the electrolyte salt include LiF, $LiClO_4$, $Mg(ClO_4)_2$, $LiPF_6$, $LiBF_4$, $LiB(OC_6H_4COO)_2$, $LiCF_3SO_3$, $LiC_4F_9SO_3$, $LiCF_3CO_2$, $Li_2C_2F_4(SO_3)_2$, $LiN(CF_3SO_2)_2$, $LiN(RfSO_2)(Rf'SO_2)$, $LiN(RfOSO_2)(Rf'OSO_2)$, $LiC(RfSO_2)_3$, $LiC_nF_{2n+1}SO_3$ ($n \geq 2$), $LiN(RfOSO_2)_2$ wherein Rf and Rf' are fluoroalkyl groups] and the like. These salts may be used alone or in combination. Among those, the fluorine-containing organic lithium salt having at least 2 carbon atoms or the imide salt is preferably used. This is because, since the fluorine-containing organic lithium salt is highly anionic and easily permits the liberation of ions, it is easily dissolved in the above solvent component, and because the imide salt has good stability. The concentration of the electrolyte salt in the electrolytic solution is not particularly restricted. However, it is preferably at least 0.5 mol/l, and also preferably 1.7 mol/l or less.

The polymer electrolyte corresponds to the gel of the above electrolytic solution. To form the gel, there are used tetrafluoroethylene-hexafluoropropylene copolymer; linear polymers such as polyethylene oxide and polyacrylonitrile or copolymer thereof; polymer compounds prepared from polyfunctional monomers (e.g., at least tetrafunctional acrylates such as dipentaerythritol-hexaacrylate); polymer compounds prepared through the reaction between amine compounds and urethane; and the like. The solid electrolytes include inorganic ones and organic ones. Examples of the inorganic solid electrolyte include sodium β-alumina, 60LiI-40Al$_2$O$_3$, Li$_3$N, 5LiI-4Li$_2$S-2P$_2$S$_5$, Li$_3$N-LiI and the like. Examples of the organic solid electrolyte include amorphous polyethers having low phase transition temperatures (Tg), amorphous vinylidene fluoride copolymers and blends of different polymers.

In the present invention, the battery, particularly, the positive electrode or the electrolyte may contain any of an organic sulfur compound other than the above polycarbon sulfide, a compound represented by the formula: —S$_y$— (y≧3), lithium sulfide, and sulfur, in order to further improve the reversibility of the above-mentioned polycarbon sulfide and the utilization factor in the charge and discharge. Particularly where the lithium sulfide is contained, preferable properties can be imparted because the following interaction is exhibited.

That is, when the above-mentioned polycarbon sulfide and the lithium sulfide are contained in the battery, the polycarbon sulfide exhibits a high catalytic activity to the lithium sulfide so that the lithium sulfide acts as an active material excellent in reversibility while the reversibility of the polycarbon sulfide is enhanced in the presence of the lithium sulfide. Accordingly, it is estimated that the battery can have a larger capacity and improved cyclic performance in charge and discharge under a large quantity of current. As the lithium sulfide, the compounds represented by the formula: Li$_2$S$_t$ (t≧2), specifically, Li$_2$S$_4$, Li$_2$S$_8$, Li$_2$S$_{18}$ and the like may be used.

Although it is sufficient for the above lithium sulfide to be present in the battery, it is preferable that the lithium sulfide is contained in the positive electrode or the electrolyte, while it is most preferable that the lithium sulfide dissolved in the electrolytic solution (the liquid electrolyte) is contained in the battery. The reason for this is that, since the lithium sulfide is soluble in the nonaqueous solvent in the electrolytic solution so that it can be eluted into the electrolytic solution even if it is contained in other component than the electrolytic solution, thus the lithium sulfide can act as an active material in combination with the polycarbon sulfide in the positive electrode. When the lithium sulfide is contained in the positive electrode, it is necessary to decrease the charge amount of the polycarbon sulfide corresponding to the volume of the lithium sulfide. By contrast, when the lithium sulfide is contained in the electrolytic solution, it is not necessary to decrease the charge amount of the polycarbon sulfide in the positive electrode, and as a result, the total amount of the active materials in the positive electrode substantially increases, which makes it easy for the battery to have a lager capacity.

Needless to say, in such case, it is desirable to use a solvent having high solubility with the lithium sulfide as the nonaqueous solvent of the electrolytic solution. Generally, such a solvent component comprises a primary solvent having a high solubility with the lithium sulfide and a secondary solvent which is optionally used. Specific examples of the primary solvent include aromatic solvents such as toluene and benzene; aliphatic or alicyclic low molecular weight solvents which contain an oxygen atom or a nitrogen atom in the molecule, such as tetrahydrofuran, dimethylformamide, 1,2-dimethoxyethane, tetramethylethylenediamine, dioxolane, 2-methyl-tetrahydrofuran and tetraglyme; sulfur-containing solvents such as dimethylsulfoxide and sulfolane; and the like. These solvents may be used alone or in combination. Among these solvents, the solvents have strong electron donor properties such as dimethylsulfoxide, sulfolane, tetrahydrofuran and tetraglyme are preferable, and particularly, the use of any of the above solvents in combination with a low viscosity ether such as tetrahydrofuran and dioxolanee is more preferable. It is, of course, possible to prepare the nonaqueous solvent only from the primary solvent described above.

Examples of the secondary or auxiliary solvent include eaters such as ethylene carbonate, propylene carbonate, butylene carbonate and γ-butyrolactone, and they may further include sulfur-based esters such as ethyleneglycolsulfite. In addition to these, there may be used linear esters such as dimethylcarbonate, diethylcarbonate, methylethylcarbonate and methyl propionate; linear triester phosphate such as trimethyl phosphate; diethylethers and the like. The addition of the above auxiliary solvents is effective to improve the ion conductivity of the electrolyte, although it tends to lower the solubility of the lithium sulfide. Therefore, the amount of the auxiliary solvent added is preferably 20 wt. % or less based on the whole weight of the solvents, although it varies depending on the nature of the primary solvent.

The lithium sulfide of the formula $Li_2S_t$ ($t \geq 2$) has such a tendency that, as the value of t increases, the solubility thereof in the electrolytic solution decreases. Thus, the viscosity of the electrolytic solution increases and the ion conductivity of the electrolyte decreases. Therefore, the sulfide of the above formula in which the value of t is not more than 50 is suitable for practical use, and it is preferably not more than 20.

Herein, the concentration of the lithium sulfide in the electrolytic solution is preferably at least 0.01 mol/l, more preferably not more than 10 mol/l, although it depends on the type of the solvent to be used and the composition of the sulfide. Particularly when the concentration of the lithium sulfide is at least 0.1 mol/l, the discharge capacity of the battery greatly increases, and when it is not more than 4 mol/l, the ion conductivity of the electrolytic solution and the utilization factor of the polycarbon sulfide can be favorably maintained.

EXAMPLES

Hereinafter, the present invention is illustrated in more detail with the Examples, which, however, should not be construed as limiting the scope of the present invention in any way. In the following Examples, the unit of % indicating the concentrations of the solutions and the dispersions, the formulations, and the yields are all % by weight, unless otherwise specified.

Example 1

Nine hydrates of sodium sulfide nonahydrate ($Na_2S \cdot 9H_2O$) (100 g) was dissolved in a water-ethanol mixed solvent (in the volume ratio 1:1) (300 ml), and sulfur (53.4 g) was added thereto. The mixture was reacted at a room temperature for one hour. Then, the solvent was removed in vacuum, and the residue was dissolved in N-methyl-2-pyrrolidone (700 ml) and further, hexachlorobutadiene (17.2 g) was added thereto. The mixture was reacted at room temperature for one hour. After that, the reaction mixture was thoroughly washed with pure water, acetone and ethanol, and dried in vacuum for 15 hours while maintaining the temperature at 40° C. Thus, a brown compound was afforded as an intermediate. The synthesis of this compound was carried out substantially in the same manner as described in the Examples of WO96/41388 (JP-A-11-506799)

The resultant compound was subjected to the elemental analysis to determine the average composition thereof. The results were as follows: C: 7.0%, S: 92.3%, N: less than 0.2%, and H: less than 0.3%. The formula corresponding to this composition was $(CS_{4.9})_n$. The elements C, N and H of the compound were analyzed using a full-automatic element-analyzing apparatus [(Vario EL (Seavelhegna Co., Ltd.)] under the following conditions: the sample-decomposing furnace temperature: 950° C., the reducing furnace temperature: 500° C., the flow rate of helium: 200 ml/min., and the flow rate of oxygen: 20 to 25 ml/min. The amount of S was analyzed by the in-flask burning-barium acetate measurement using trimethylene blue as an indicator.

Next, the above intermediate (10 g) was put in a boat-shaped vessel of alumina (aluminum oxide), and the vessel with the intermediate therein was placed on the center of an alumina heating furnace. After the furnace interior was replaced with an argon gas having a purity of 99.999% until the oxygen concentration reached to 100 ppm or less, the furnace temperature was changed under the following conditions while flowing the argon gas, and the intermediate was heat-treated at 380° C. That is, the furnace temperature was raised from room temperature to 60° C. in 0.5 hour and kept at 60° C. for one hour, and then raised to 380° C. in 2 hours and kept at 380° C. for one hour so as to eliminate a part of the sulfur atoms in the intermediate. Thus, the intermediate was converted to a polycarbon sulfide.

After the completion of the heat treatment, the reaction product was cooled to room temperature, and taken out from the furnace to obtain the black polycarbon sulfide having metallic gloss like graphite (about 3 g). As a result of elemental analysis, the composition of this polycarbon sulfide was determined as follows: C: 26.0%, and S: 73.9%, and it was expressed by the formula: $(CS_{1.06})_n$. Since hexachlorobutadiene used in the above synthesis had 4 carbon atoms, the value of n in the formula: $(CS_{1.06})_n$ of the above polycarbon sulfide was estimated to be at least 4 and a multiple of 4.

Next, the polycarbon sulfide was subjected to Raman analysis under the following conditions, using the following apparatus. The results are shown in Table 1.

Apparatus: Ramaonor T-6400 (available from Jobin Yvon and Atago Bussan K. K.)

Light Source: Ar laser [GLG3460 (514.5 nm, output: 1 mW (NEC)]

With reference to FIG. 1, the axis of abscissa indicates a Raman shift ($cm^{-1}$) and the axis of ordinate, a relative intensity. As shown in FIG. 1, according to the results of the Raman analysis of the polycarbon sulfide $(Cs_{1.06})_n$, there appeared a main peak assigned to the carbon-carbon unsaturated bond (C=C bond) at 1444 $cm^{-1}$, and only one peak appeared at 490 $cm^{-1}$ within the range of 400 to 525$cm^{-1}$. In other words, the above polycarbon sulfide showed the peaks assigned to the disulfide linkages only but no peak assigned to the polysulfide segments. In case of disulfide linkages bonded to carbon, a peak assigned to the disulfide linkages generally appears at or around 505 $cm^{-1}$. However, in case of the polycarbon sulfide of the present invention, it was inferred that the peak position shifted because of the influence of the above carbon-carbon unsaturated bond (C=C).

Further, a powder X-ray diffraction apparatus [RINT2000 (Rigaku-sha K. K.)] was used to subject the above polycarbon sulfide to X-ray diffractometry using the CuKα ray. The measurement was conducted within the range of diffraction angle (2 θ) of 10 to 80° under the following conditions.

Figure 2:
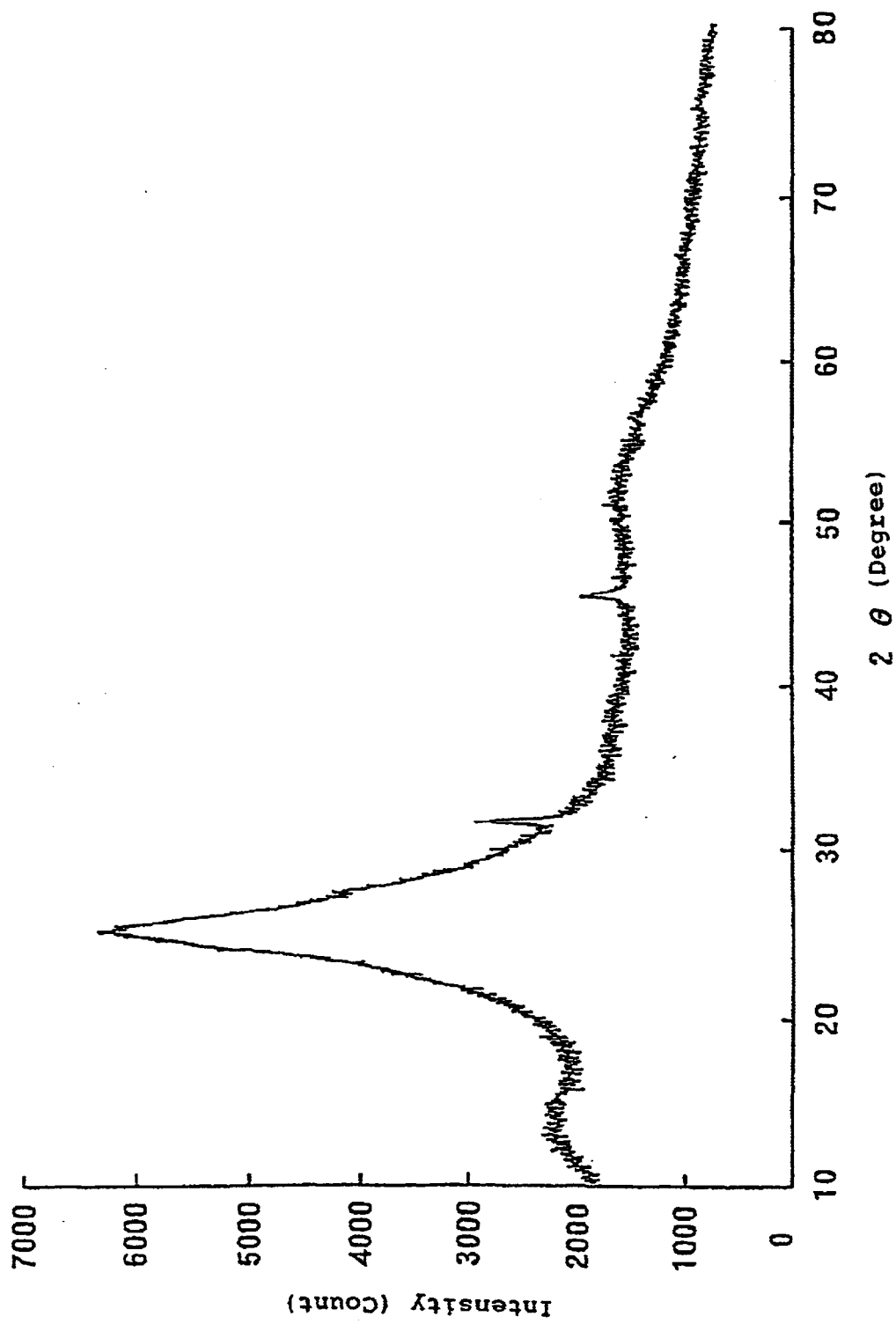
FIG. 2 shows the X-ray diffraction pattern of the polycarbon sulfide (CS$_{1.06}$)$_n$ prepared in Example 1.

Voltage: 40 kV
Current: 150 mA
Scanning rate: 2°/min.
Sampling: 0.02°
Number of integration: 5 times The diffraction pattern of $(CS_{1.06})_n$ obtained by the above X-ray diffractometry is shown in FIG. 2. Within the range of diffraction angle (2 θ) of 20 to 30°, only one broad diffraction peak having a peak around 25° was observed. In this connection, the peaks at 31.8° and 45.5° were assigned to sodium chloride.

Figure 3:
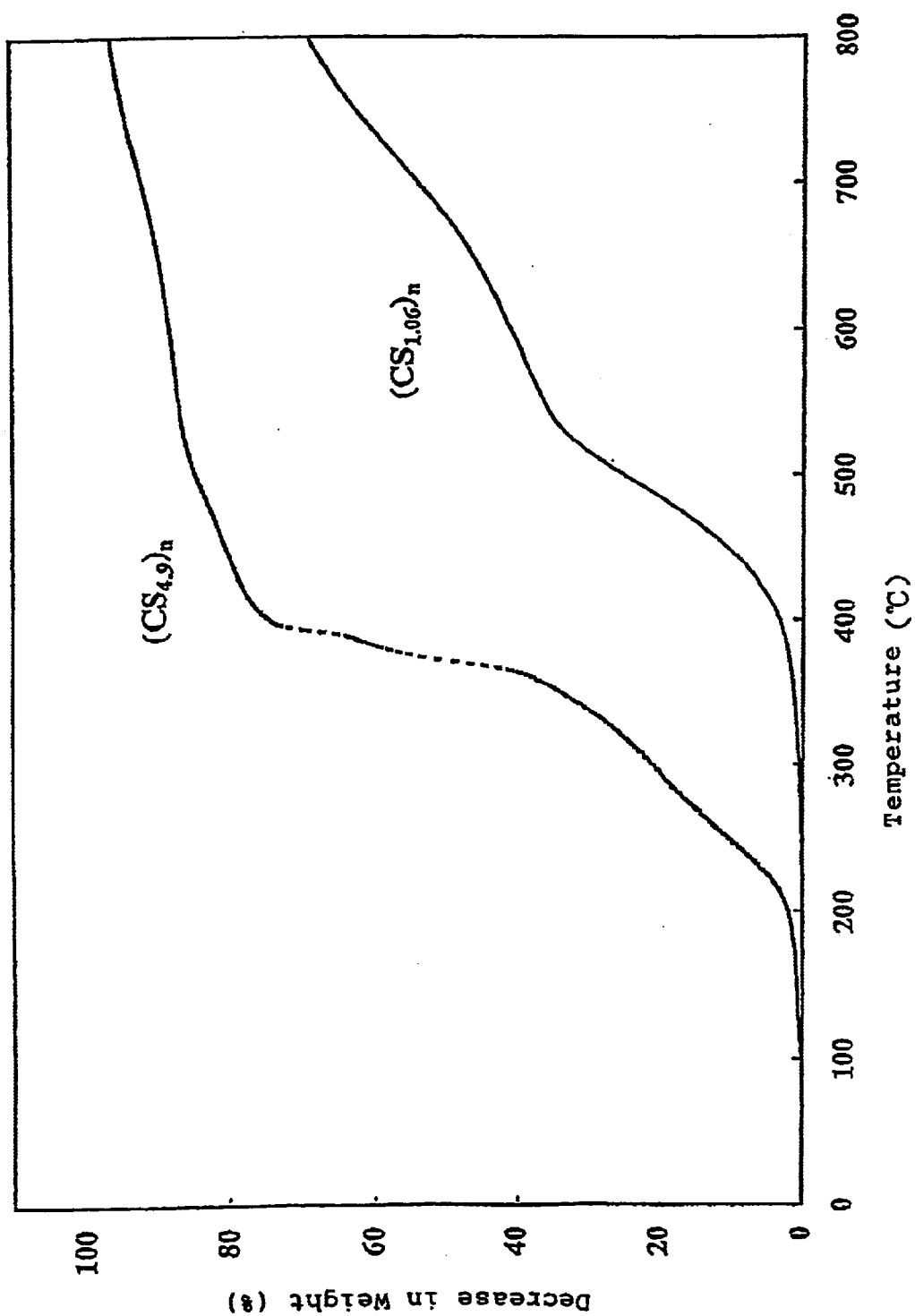
FIG. 3 shows changes in weight of the polycarbon sulfide (CS$_{1.06}$)$_n$ prepared in Example 1 and an organic sulfur compound (CS$_{4.9}$)$_n$ prepared in Comparative Example 1, which were found by thermogravimetric-differential thermal analyses.

Further, a thermal analyzer (Thermo Plus TG8120) manufactured by Rigaku-sha K. K. was used to subject the above polycarbon sulfide to thermogravimetric-differential thermal analysis (TG-DTA). That is, the polycarbon sulfide was heated at a heating rate of 10° C./min. under the flow of a high purity nitrogen gas at a rate of 0.15 liter/min., and the relationship between the temperature and a change in weight was observed. The results are shown in FIG. 3. FIG. 3 also shows the results of a compound $(CS_{4.9})_n$ of Comparative Example 1 described later. As can be seen from the results of FIG. 3, the known organic sulfur compound $(CS_{4.9})_n$ showed a decrease in weight from about 100° C. and a rapid decrease in weight about 200° C. In contrast, the polycarbon sulfide $(CS_{1.06})_n$ of the present invention showed no decrease in weight until about 300° C. (the decrease in weight at 300° C.: about 0.5%), and thus the polycarbon sulfide was found to be stable.

The polycarbon sulfide $(CS_{1.06})_n$ was milled to a powder with a particle size of about 75 μm, and this powder (0.5 g) was charged in a holder with a diameter of 5 mm and compressed and molded under a pressure of 2 tons. Then, a direct current of 100 nA was applied to the molded powder to measure its electrical conductivity at 25° C. As a result, the electrical conductivity was $5 \times 10^{-7}$ Scm$^{-1}$. By contrast, when the compound $(CS_{4.9})_n$ of Comparative Example 1 and a compound $(CS_{2.6})_n$ of Comparative Example 2 described later were subjected to the same measurements. The electrical conductivities thereof were less than $10^{-11}$ Scm$^{-1}$, respectively. It is understood from these results that, since the polycarbon sulfide of the present invention had a more uniform molecular structure than the conventional organic sulfur compounds, the electrical conductivity of the polycarbon sulfide was improved.

Furthermore, the true density of the polycarbon sulfide was measured at 25° C. by the gas displacement method, resulting in 1.903 g/cm$^3$. This value was smaller than the true density of the compound $(CS_{2.6})_n$ of Comparative Example 2 described later, i.e., 2.047 g/cm$^3$ and that of a rhombic sulfur, i.e., 2.07 g/cm$^3$, because it was inferred that a lot of rings formed by carbon atoms and sulfur atoms as represented by the following formula in the molecule would give some influence.

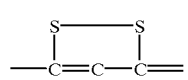

(III)

Example 2

Example 1 was repeated to provide a polycarbon sulfide $(CS_{1.1})_n$, except that the temperature for the heat treatment in Example 1 was changed to 370° C. This polycarbon sulfide was subjected to a Raman analysis and X-ray diffractometry in the same manner as in Example 1.

In the Raman analysis, the polycarbon sulfide $(CS_{1.1})_n$ similarly showed the main peak at 1444 cm$^{-1}$ and also showed only one peak at 490 cm$^{-1}$ within the range of 400 to 525 cm$^{-1}$, as observed in $(CS_{1.06})_n$. Also, this polycarbon sulfide showed a diffraction pattern substantially conformable with that of $(CS_{1.06})_n$ in the X-ray diffractometry.

Example 3

Example 1 was repeated to produce a polycarbon sulfide $(CS_{0.9})_n$, except that the temperature for the heat treatment in Example 1 was changed to 390° C. This polycarbon sulfide was subjected to the Raman analysis and X-ray diffractometry in the same manner as in Example 1.

In the Raman analysis, the polycarbon sulfide $(CS_{0.9})_n$ similarly showed the main peak at 1442 cm$^{-1}$ and also showed only one peak at 494 cm$^{-1}$ within the range of 400 to 525 cm$^{-1}$, like $(CS_{1.06})_n$. Also, this polycarbon sulfide showed a similar diffraction pattern to that of $(CS_{1.06})_n$ in the X-ray diffractometry, and showed a broad peak only at 24.4°.

Example 4

The intermediate (10 g) synthesized in Example 1 was charged in a boat-shaped alumina vessel, and the vessel with the intermediate therein was placed on the center of the alumina heating furnace. The furnace interior was replaced with an argon gas having a purity of 99.999% until the oxygen concentration reached to less than 400 ppm. Then, the interior atmosphere was evacuated to less than 2 Pa. With maintaining the vacuum, the intermediate was heat treated while the furnace temperature was changed under the same conditions as in Example 1 to produce a polycarbon sulfide $(CS_{1.02})_n$. This polycarbon sulfide was subjected to the Raman analysis and X-ray diffractometry in the same manner as in Example 1.

In the Raman analysis, the polycarbon sulfide $(CS_{1.02})_n$ similarly showed the main peak at 1443 cm$^{-1}$ and also showed only one peak at 490 cm$^{-1}$ within the range of 400 to 525 cm$^{-1}$, like $(CS_{1.06})_n$. Also, this polycarbon sulfide showed a similar diffraction pattern to that of $(CS_{1.06})_n$ in the X-ray diffractometry, and showed a broad peak only at 25.5°.

Example 5

Example 4 was repeated to produce a polycarbon sulfide $(CS_{1.38})_n$ except that the temperature for the heat treatment in Example 4 was changed to 355° C. and that the time for maintaining at the treating temperature was changed to 5 hours. This polycarbon sulfide was subjected to the Raman analysis and X-ray diffractometry in the same manner as in Example 1.

In the Raman analysis, the polycarbon sulfide $(CS_{1.38})_n$ similarly showed the main peak at 1442 cm$^{-1}$ and also showed only one peak at 488 cm$^{-1}$ within the range of 400 to 525 cm$^{-1}$. Also, this polycarbon sulfide showed a broad peak only at 24.7°.

Example 6

Under the flow of a nitrogen gas, the cut pieces of metal sodium (15 g) was placed in a 500-ml four-necked flask equipped with a thermometer, a dripping funnel, condenser tube, a nitrogen-displacing inlet and an airtight stirrer, and anhydrous xylene (100 ml) was added thereto. The mixture was refluxed under heating on an oil bath at 110 to 120° C. The heating was stopped after the metal sodium had been melted, and the mixture was vigorously stirred and then cooled to room temperature. Then, the xylene was removed and the metal sodium was washed twice with anhydrous ether (10 ml). Carbon disulfide (204 g) was added thereto. While heating and refluxing the mixture on an oil bath at 55° C., dimethylsulfoxide (DMSO) (180 ml) was slowly added dropwise over 5 hours, and the mixture was refluxed for 15 hours. After that, the reaction solution was cooled to room temperature and left to stand for 24 hours. The carbon disulfide in the above reaction solution was evaporated at 55° C., and the remaining solution was heated to 110° C. in an oil bath, and the solution was reacted at the same temperature for 20 hours and then cooled to room temperature. While cooling the flask containing the reaction product on ice, pure water (250 ml) was slowly added over 20 minutes, and then, concentrated hydrochloric acid (60 ml) was added dropwise in one hour to obtain a blackish brown suspension. The suspension was decanted to separate the precipitated solid. The solid was thoroughly washed with acetone and water, and the resultant red-brown solid was dried for 2 hours in vacuum while the keeping the temperature at 185° C., to produce a blackish brown intermediate (33 g) represented by the formula: $(CS_{2.6})_n$. The synthesis of this compound was conducted substantially in the same manner as described in Examples of WO96/41387 (corresponding to JP-A-11-514128).

Figure 4:
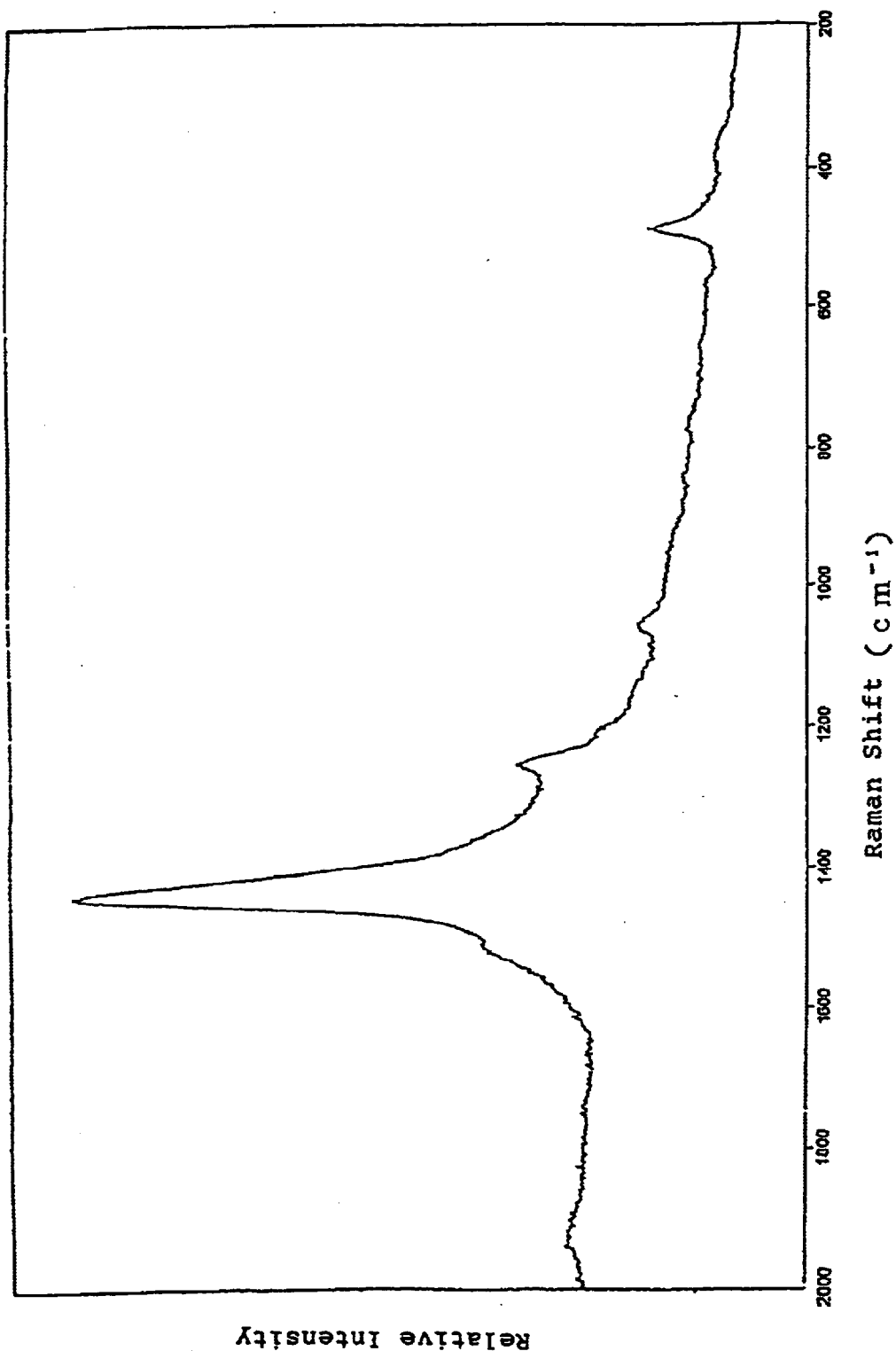
FIG. 4 shows the Raman spectrum of a polycarbon sulfide (CS$_{1.13}$)$_n$ prepared in Example 6.

The above compound was milled in a ball mill to a powder with a particle size of about 10 μm and the resultant powder (10 g) was placed in a 300-ml three-necked flask equipped with a condenser tube and a nitrogen-displacing inlet, and carbon disulfide (100 ml) was added thereto. The mixture was refluxed under an argon atmosphere for 5 hours to eliminate a part of the sulfur atoms composing the above compound to form disulfide linkages. After that, the reaction mixture was cooled to room temperature and subjected to centrifugation to collect the precipitate. The precipitate was dried at 50° C. in vacuum for 12 hours to produce a polycarbon sulfide of the formula: $(CS_{1.13})_n$ having a blackish metallic gloss. This polycarbon sulfide was subjected to the Raman analysis and X-ray diffractometry in the same manner as in Example 1. The result of the Raman analysis is shown in FIG. 4.

In the Raman analysis, the polycarbon sulfide of the formula: $(CS_{1.13})_n$ showed the main peak at 1438 cm$^{-1}$ and showed a peak only at 489 cm$^{-1}$ within the range of 400 to 525 cm$^{-1}$. Also, in the X-ray diffractometry, the compound showed a broad peak only at 25.5°.

Example 7

The solvent extraction was carried out in the same manner as in Example 6 to produce a polycarbon sulfide $(CS_{1.11})_n$, except that dimethylsulfoxide was used instead of the carbon disulfide which was used in the course of converting the intermediate to the polycarbon sulfide by the solvent extraction in Example 6. This polycarbon sulfide was subjected to a Raman analysis and an X-ray diffractometry in the same manner as in Example 1.

In the Raman analysis, the polycarbon sulfide of the formula: $(CS_{1.11})_n$ showed the main peak at 1439 cm$^{-1}$ and showed a peak only at 489 cm$^{-1}$ within the range of 400 to 525 cm$^{-1}$. Also, in the X-ray diffractometry, the compound showed a broad peak only at 25.5°.

Example 8

The interior of a 2-liter four-necked flask equipped with a condenser tube with a dry ice rack was replaced with nitrogen. The flask was cooled on a methanol-dry ice bath, and ammonia (500 ml) was slowly added to the flask at a bath temperature of −75.5° C., and the flask with the ammonia was kept overnight at a temperature of not higher than −70° C. After that, sodium (55.1 g) was added at an internal temperature of −63° C., and an acetylene gas was blown into the flask at a rate of 470 ml/min. at a bath temperature of −76° C. for 2.5 hours. After stirring for 30 minutes, sulfur (135 g) was added at an internal temperature of −63° C., and the mixture was reacted for 8 hours. Then, ammonium chloride (76 g) was added and the mixture was left to stand at −70° C. overnight. Next, the mixture was warmed to room temperature and kept at the same temperature for 3 days. After that, the pH of the reaction system was adjusted to 2 to 3, using hydrochloric acid, so as to precipitate a product. The precipitated product was collected by filtration and dried at 70° C. to obtain a blackish green precipitate (about 70 g). As a result of the elemental analysis, the molar ratio of carbon to sulfur in the synthesized compound was 1:5.5. The synthesis of this compound was carried out substantially in the same manner as described in Examples of WO96/41388 (corresponding to JP-A-11-506799).

Next, the above compound (10 g) was added to toluene and reacted at room temperature for 5 hours. The reaction mixture was subjected to centrifugation to collect a precipitate. The resultant precipitate was added to tetraglyme, and the mixture was reacted at 80° C. for 8 hours to produce a polycarbon sulfide of the formula: $(CS_{1.09})_n$ (about 2.2 g). This polycarbon sulfide showed the main peak at 1435 cm$^{-1}$ and showed a peak only at 492 cm$^{-1}$ within the range of 400 to 525 cm$^{-1}$ in the Raman analysis.

Comparative Example 1

An organic sulfur compound represented by the formula: $(CS_{4.9})_n$ was prepared as an intermediate in the same manner as in Example 1.

Comparative Example 2

An organic sulfur compound represented by the formula: $(CS_{2.6})_n$ was prepared as an intermediate in the same manner as in Example 6.

Figure 5:
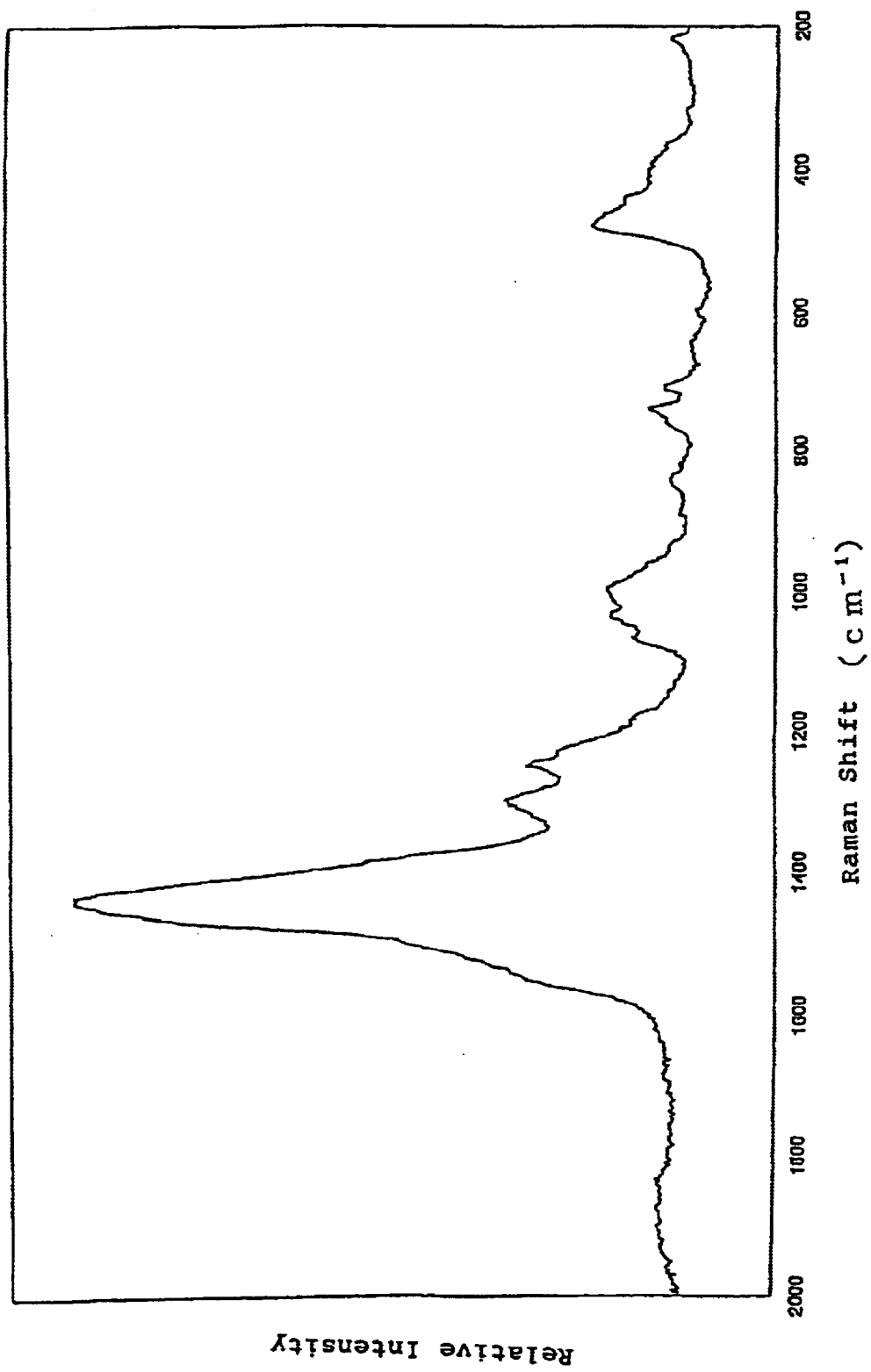
FIG. 5 shows the Raman spectrum of an organic sulfur compound (CS$_{2.6}$)$_n$ prepared in Comparative Example 2.
Figure 6:
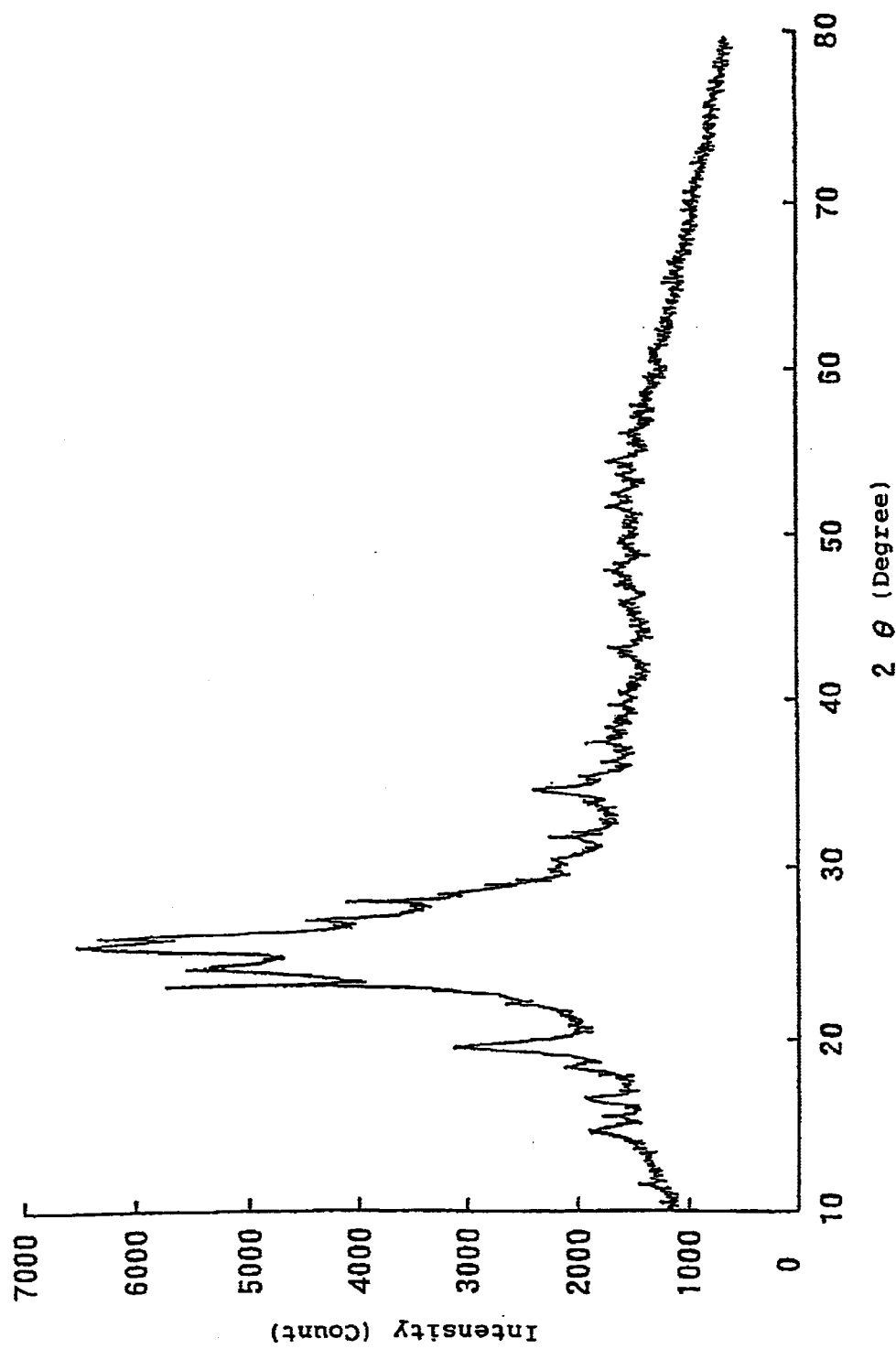
FIG. 6 shows the X-ray diffraction pattern of the organic sulfur compound (CS$_{2.6}$)$_n$ prepared in Comparative Example 2.

These compounds of the formulae $(CS_{4.9})_n$ and $(CS_{2.6})_n$ were subjected to the Raman analyses and X-ray diffractometry in the same manner as in Example 1. The result of the Raman analysis of $(CS_{2.6})_n$ is shown in FIG. 5, while the result of the X-ray diffractometry thereof is shown in FIG. 6. In the Raman analyses, either of $(CS_{4.9})_n$ and $(CS_{2.6})_n$ showed a plurality of peaks which were assigned to the polysulfide segments and which were overlapped on one another within the range of 400 to 525 cm$^{-1}$, and showed no peak assigned to a disulfide linkage. In addition, in either of the compounds, the peak at or around 1444 cm$^{-1}$ was broader than the peak assigned to the polycarbon sulfide of the present invention. Therefore, it is considered that the structures of the backbones, mainly composed of carbon atoms, of the compounds of Comparative Examples would be not so uniform. The compounds of Comparative Examples showed further peaks (at or around 1000 cm$^{-1}$, etc.) which the polycarbon sulfides of the present invention never showed. Thus, it can be inferred that the compounds of Comparative Examples have the molecular structures fairly different from those of the polycarbon sulfides of the present invention.

Further, either of $(CS_{4.9})_n$ and $(CS_{2.6})_n$ showed a plurality of diffraction peaks in the X-ray diffractometry, and most of the diffraction peaks were identified with the diffraction peaks of sulfur, and thus did not show such definite peaks that would be assigned to crystalline structures and that the polycarbon sulfides of the present invention showed.

In the following Examples, nonaqueous electrolytic secondary batteries were constructed, using the polycarbon sulfides of Examples 1 to 6 and the organic sulfur compounds of Comparative Examples 1 and 2 as the active materials for positive electrodes, and their performance was evaluated.

Example 9

Firstly, a positive electrode was constructed as follows:

Each of the polycarbon sulfides of Examples 1 to 6 (10 wt. parts) or each of the organic sulfur compounds of Comparative Examples 1 and 2 (10 wt. parts), graphite (KS-6 manufactured by Ronza) (7.2 wt. parts) and acetylene black (0.8 wt. part) were charged in a mixing vessel and dry-mixed for 10 minutes, and N-methyl-2-pyrrolidone (50 wt. parts) was added and mixed for 30 minutes. Then, an N-methyl-2-pyrrolidone solution (16.7 wt. parts) containing 12% of polyvinylidene fluoride was added to the mixture, and they were further mixed for one hour to prepare a paste containing a formulation for positive electrode.

The resultant paste was applied to an aluminum foil (250 mm×220 mm) with a thickness of 20 μm and dried on a hot plate at 50° C. for 10 minutes, and then, further dried at 120° C. in vacuum for 10 hours to remove N-methyl-2-pyrrolidone. Thus, a layer of the formulation for positive electrode was formed. The layer with the aluminum foil was dried and heated to 100° C. and pressed, so that a positive electrode having the formulation layer with a thickness of 20 μm was obtained.

Separately, a negative electrode was constructed by superposing a lithium foil with a thickness of 200 μm on a nickel mesh (250 mm×220 mm) under an argon gas atmosphere, and pressing them with a roller to tightly apply the lithium foil to the nickel mesh.

An electrolytic solution was prepared by dissolving $LiPF_6$ (1.4 mol/l) in a mixed solvent of propylene carbonate and ethylene carbonate in a weight ratio of 1:1.

Then, the above positive electrode and the negative electrode were laminated on each other through a separator composed of a non-woven polypropylene fabric with a thickness of 80 μm under an argon gas atmosphere, and the resultant laminate was enclosed in an envelope composed of a three-layer laminate film comprising a nylon film, aluminum foil and modified polyolefin resin film. The envelope was charged with the above electrolytic solution and sealed to provide a nonaqueous electrolytic secondary battery. This battery was charged and allowed to discharge at a current value corresponding to 60 mA per one gram of the active material for positive electrode (discharge termination voltage: 1.5 V). This cyclic charge and discharge was repeated 10 times, and the discharge capacities of the third cycle and the tenth cycle were measured, and a change in discharge capacity per one gram of the active material for positive electrode was examined. The results are shown in Table 1.

TABLE 1

| Active Material for Positive Electrode | Discharge Capacity (mAh/g) | |
|---|---|---|
| | the 3rd Cycle | The 10th Cycle |
| $(CS_{0.9})_n$ | 555 | 545 |
| $(CS_{1.02})_n$ | 607 | 606 |
| $(CS_{1.06})_n$ | 612 | 610 |
| $(CS_{1.1})_n$ | 630 | 614 |
| $(CS_{1.13})_n$ | 625 | 608 |
| $(CS_{1.38})_n$ | 490 | 465 |
| $(CS_{2.6})_n$ | 173 | 65 |
| $(CS_{4.9})_n$ | 230 | 110 |

As can be seen from the results of Table 1, the polycarbon sulfides of the present invention showed larger capacities when comprised into the batteries, as compared with those of the conventional organic sulfur compounds of the formulae: $(CS_{2.6})_n$ and $(CS_{4.9})_n$. Further, the polycarbon sulfides of the present invention are highly stable to the electrolytic solutions, and therefore, a decrease in capacity in association with the charge and discharge cycles is small. Thus, the highly reliable nonaqueous electrolytic secondary batteries can be provided. Particularly, the polycarbon sulfides of the formula: $(CS_x)_n$ wherein x is a number of 0.9 to 1.3 showed excellent features, among which the polycarbon sulfides of the above formula wherein x is 1 to 1.1 had high stability.

Example 10

Example 9 was repeated to construct a nonaqueous electrolytic secondary battery, except that the polycarbon sulfide of the formula: $(CS_{1.06})_n$ was used as an active material for positive electrode, and that 5.7 wt. parts of graphite and 1.5 wt. parts of nickel powder with an average particle size of 5 μm were used instead of 7.2 wt. parts of graphite which was used for the preparation of the paste containing the positive electrode formulation in Example 9.

Example 11

Example 9 was repeated to construct a nonaqueous electrolytic secondary battery, except that the polycarbon sulfide of the formula: $(CS_{1.06})_n$ was used as an active material for positive electrode, and that a nickel foil with a thickness of 10 μm was used as a current collector for positive electrode, instead of the aluminum foil.

The batteries of Examples 10 and 11 and the battery of Example 9 in which the polycarbon sulfide of the formula: $(CS_{1.06})_n$ was used as the active material for positive electrode were subjected to 50 cycles of charge and discharge under the same conditions as those of the previous tests so as to measure the discharge capacities of the 50th cycle. The results are shown in Table 2 as discharge capacities per one gram of the active materials for positive electrodes.

TABLE 2

| | Discharge Capacity (mAh/g) At 50th Cycle |
|---|---|
| Example 10 | 576 |
| Example 11 | 590 |
| Example 9 | 146 |

The batteries of Examples 10 and 11 were greatly improved in cyclic charge and discharge performance by containing nickel in the positive electrodes, as compared with the battery of Example 9.

Example 12

Example 9 was repeated to construct a nonaqueous electrolytic secondary battery, except that the polycarbon sulfide of the formula: $(CS_{1.06})_n$ and NiS in a weight ratio of 9:1 to 4:6 were contained in the positive electrode formulation-containing paste (provided that the total of both components was 10 wt. parts). In other words, a part of the polycarbon sulfide was substituted with the nickel sulfide in the battery of Example 12.

The battery of Example 12 and that of Example 9 in which the polycarbon sulfide of the formula: $(CS_{1.06})_n$ was used as the active material for positive electrode were charged and allowed to discharge at a current value corresponding to 150 mA per one g in total of the polycarbon sulfide and NiS (discharge termination voltage: 1.0 V), and this cyclic charge and discharge was repeated 10 times. The discharge capacities of the first cycle and the tenth cycle were measured. The results are shown in Table 3 as the discharge capacity per one g in total of the polycarbon sulfide and NiS.

TABLE 3

|  | Content in Positive Electrode Formulation (wt. %) |  | Discharge Capacity (mAh/g) at |  |
|---|---|---|---|---|
|  | $(CS_{1.06})_n$ | NiS | 1st Cycle | 10th Cycle |
| Example 9 | 50 | 0 | 607 | 218 |
| Example 12 | 45 | 5 | 589 | 420 |
|  | 40 | 10 | 592 | 580 |
|  | 32.5 | 17.5 | 598 | 607 |
|  | 30 | 20 | 611 | 598 |
|  | 25 | 25 | 602 | 594 |
|  | 20 | 30 | 587 | 490 |

As can be seen from the results of Table 3, by containing the nickel sulfide in the positive electrode, the positive electrode could maintain excellent reversibility even when the current value was greatly increased in the course of the charge and discharge cycles, and the decrease in capacity in association with the cycles was inhibited. Further, although the content of the carbon polysulfide was decreased by the addition of the nickel sulfide, the nickel sulfide itself acted as an active material. Therefore, advantageously, the discharge capacity of the battery was not substantially decreased.

Figure 7:
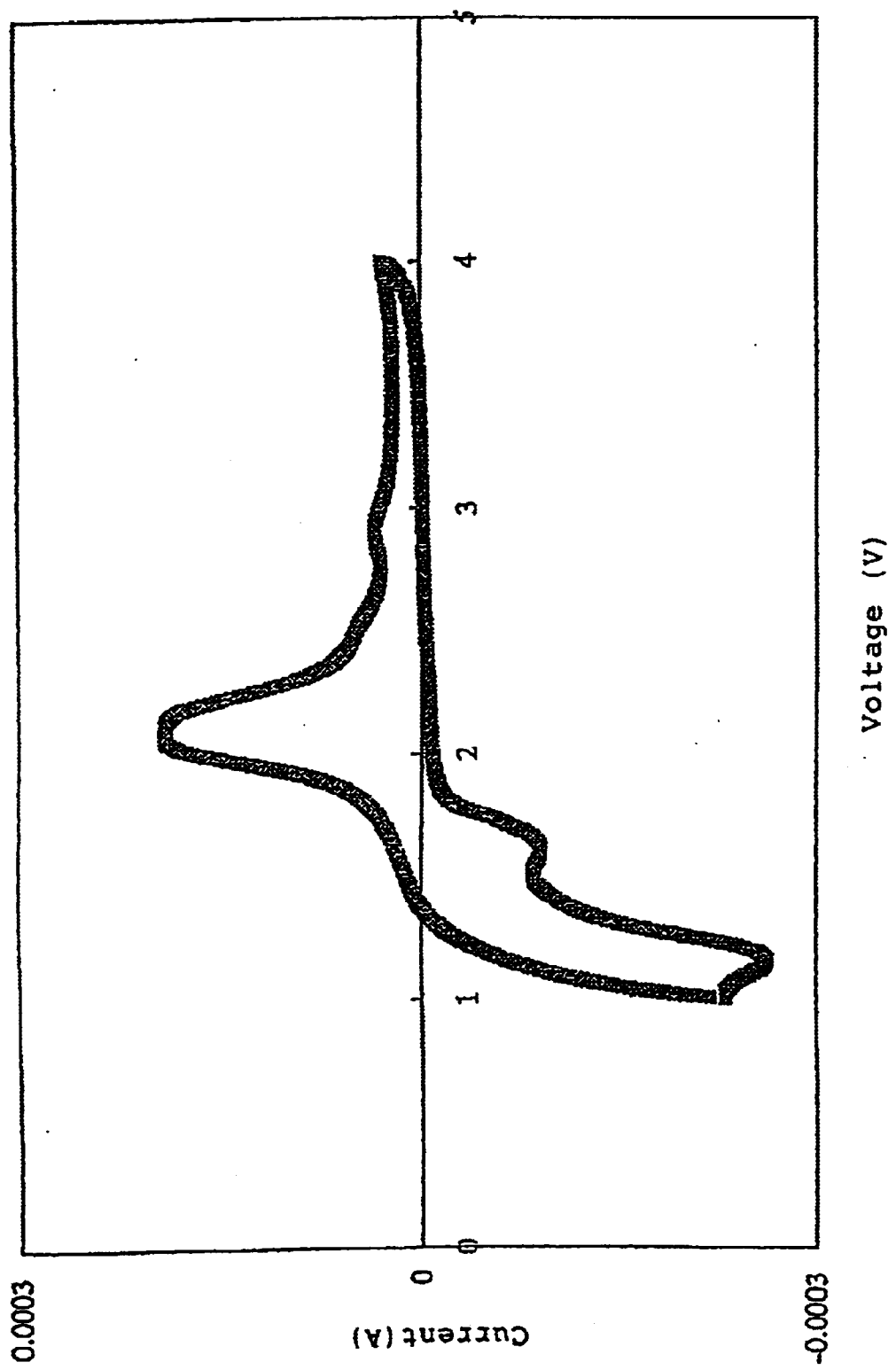
FIG. 7 shows the cyclic voltamograph of a positive electrode constructed in Example 12, using the polycarbon sulfide (CS$_{1.06}$)$_n$ and NiS in a, weight ratio of 8:2.

On the other hand, a model battery was constructed using a positive electrode comprising the carbon polysulfide of $(CS_{1.06})_n$ and NiS in a weight ratio 8:2 as an active electrode, using a lithium electrode as a counter electrode, and using another lithium electrode as a reference electrode. The model battery was tested on the cyclic voltamometry at an electric potential sweep rate of 10 mV/sec. The cyclic voltamograph of the above positive electrode is shown in FIG. 7. In this graph, the electric potentials of the oxidation peak and the reduction peak were close to each other, which indicates the high reversibility of the polycarbon sulfide of the present invention relative to the oxidation and the reduction.

Example 13

An electrolytic solution containing a lithium sulfide was prepared as follows:

The electrolytic solution was prepared by dissolving $LiCF_3SO_3$ at a concentration of 1 mol/l in a mixed solvent of tetraglyme and 1,3-dioxolane in a volume ratio of 1:1. To the electrolytic solution (86.5 g) were added $Li_2S$ (2.3 g) and sulfur (11.2 g) under a moisture-proof atmosphere, and the mixture was refluxed at 80° C. for 5 hours so as to synthesize $Li_2S_8$ in the electrolytic solution. The content of $Li_2S_8$ in the electrolytic solution was 0.5 mol/l, and the concentration of $LiCF_3SO_3$ was decreased to 0.87 mol/l in association with the synthesis of $Li_2S_8$.

Next, a nonaqueous electrolytic secondary battery was constructed in the same manner as in Example 11, except that the above electrolytic solution was used instead of the electrolytic solution of Example 11.

Example 14

Example 13 was repeated to construct a nonaqueous electrolytic secondary battery, except that the content of $Li_2S_8$ in the electrolytic solution of Example 13 was changed to 1.0 mol/l.

Example 15

Example 14 was repeated to construct a nonaqueous electrolytic secondary battery, except that a mixed solvent of dimethylsulfoxide and 1,3-dioxolane in a volume ratio of 1:1 was used as a nonaqueous solvent of the electrolytic solution.

Example 16

Example 13 was repeated to construct a nonaqueous electrolytic secondary battery, except that $(CS_{1.38})_n$ was used as an active material for positive electrode.

Comparative Example 3

Example 15 was repeated to construct a nonaqueous electrolytic secondary battery, except that a carbon electrode described below was used as a positive electrode. The carbon electrode used as the positive electrode of the battery of Comparative Example 3 was composed of 82% of graphite (KS-6), 8% of acetylene black and 10% of polyvinylidene fluoride.

The batteries of Examples 13 to 16 were charged with constant current-constant voltage and allowed to discharge at a constant current, respectively. This cyclic charge and discharge was repeated 50 times and the discharge capacities of the first cycle and the fiftieth cycle were measured to examine a change in discharge capacity per one gram of the polycarbon sulfide. In this regard, the constant current charge in the constant current-constant voltage charge was set at a current value corresponding to 60 mA per one g in total of the polycarbon sulfide and $Li_2S_8$, and the upper limit value of the voltage was set at 2.5 V. The current value of the discharge was set at the same value as the current value of the constant current charge, and the current was discharged until the voltage of the battery reached 1.5 V. The results are shown in Table 4 as the discharge capacity per one gram of the polycarbon sulfide.

Also, the battery of Comparative Example 3 was charged and allowed to discharge in the same manner as above. However, the positive electrode was broken at the second cycle, so that the charge and discharge became impossible. In other words, where only $Li_2S_8$ was used as the active material, the resultant battery could not function as a secondary battery. The discharge capacity at the first cycle was as low as 167 mAh/g per one gram of $Li_2S_8$.

TABLE 4

|  | Content of | Discharge Capacity (mAh/g) at | |
|---|---|---|---|
|  | $Li_2S_8$ (mol/l) | 1st Cycle | 50th Cycle |
| Example 13 | 0.5 | 1164 | 1088 |
| Example 14 | 1.0 | 1728 | 1596 |
| Example 15 | 1.0 | 1806 | 1587 |
| Example 16 | 0.5 | 1182 | 1040 |

Although the discharge capacity of the polycarbon sulfide was about 600 mAh/g as indicated in the above Table 1 or 2, the apparent discharge capacity of the polycarbon sulfide was greatly increased by the addition of the lithium sulfide to the electrolytic solution, and thus, the battery easily could have a higher capacity. In addition, the large discharge capacity could be maintained even after the cycle was repeated many times. It is considered that this advantage may be due to not only the fact that the lithium sulfide acted as the active material but also the fact that the coexistence of the lithium sulfide and the carbon polysulfide provided the effect of improving their reversibility with each other. In detail, each of the batteries of the foregoing Examples succeeded in greatly increasing the discharge capacity, in spite of having the same volume as that of Example 11 or the like, by containing not only the solid active material (the carbon polysulfide) but also the liquid active material (the lithium sulfide) dissolved in the electrolytic solution. Needless to say, it is also possible to use the lithium sulfide in the form of a gel by containing the lithium sulfide in a polymer electrolyte.

Example 17

Nonaqueous electrolytic secondary batteries were constructed as follows, using the carbon polysulfides of Examples 1 and 3 to 5. The carbon polysulfide (10 wt. parts), graphite (KS-6) (2.2 wt. parts) and acetylene black (0.8 wt. parts) were added to a mixing vessel and dry-mixed for 10 minutes. Then, N-methyl-2-pyrrolidone (20 wt. parts) was added and mixed thereinto for 30 minutes. Next, an N-methyl-2-pyrrolidone solustion (21.6 wt. parts) containing 7.4% of polyaniline and an N-methyl-2-pyrrolidone solution (16.7 wt. parts) containing 12% of polyvinylidene fluoride were added and further mixed thereinto for one hour to prepare a positive electrode formulation-containing paste. The paste was used to construct a nonaqueous electrolytic secondary battery in the same manner as in Example 9.

Example 18

Example 17 was repeated to construct a nonaqueous electrolytic secondary battery, except that polypyrrole was used as a conductive polymer.

Example 19

An amine compound (Jeffamine XTJ-502 manufactured by Huntsman) (100 g) was dissolved in a mixed solvent (130 g) of propylene carbonate and ethylene carbonate in a weight ratio of 1:1. To the solution was added an epoxy resin (SR-8EG manufactured by Sakamoto Yakuhin Co., Ltd.) (25.2 g), and the mixture was reacted under stirring at room temperature for 7 days. To the solution of the amine compound obtained by the above reaction, $LiCF_3SO_3$ was added and stirred to prepare a homogenous solution containing the same at a concentration of 1.0 mol/l. Separately, a urethane (AX-1043) manufactured by Mitsui Chemical Co., Ltd. was dissolved in a mixed solvent of methylethyl carbonate and ethylene carbonate in a weight ratio of 2:1, and further, $LiCF_3SO_3$ was added to the solution so that the resultant solution contained the same at a concentration of 1.0 mol/l. The above amine compound-containing solution and the above urethane-containing solution were mixed so that the molar ratio of the active hydrogen of the amine to the isocyanate groups of the urethane was 1.1:1. A piece of nonwoven polybutylene-terephthalate fabric with an average thickness of 80 μm was dipped in the above solution mixture, taken out therefrom and then left to stand for 2 hours. Thus, a polymer electrolyte having the polybutyleneterephthalate cloth as the substrate was provided. All the above operations were carried out under a dry air atmosphere having a dew-point of −60° C. or lower.

Next, an electrolytic solution was prepared by adding $LiCF_3SO_3$ to a mixed solvent of methylethyl carbonate and ethylene carbonate in a weight ratio of 2:1 so that the concentration of $LiCF_3SO_3$ could be 1.0 mol/l. The positive electrode and the negative electrode both containing $(CS_{1.06})_n$ used in Example 17, as active materials, were used to construct a battery. The surfaces of the positive and negative electrodes were wetted with the electrolytic solution, and the positive electrode and the negative electrode were laminated on each other through the above polymer electrolyte, and the resultant laminate was enclosed in the same envelope as used in Example 9. The electrolytic solution was injected into the envelope, which was then sealed to finish the nonaqueous electrolytic secondary battery.

Example 20

Example 17 was repeated to construct a nonaqueous electrolytic secondary battery, except that increased amounts of graphite and acetylene black were used instead of the polyaniline of Example 17.

The batteries of Examples 17 to 20 were subjected to the initial discharge at a current value corresponding to 60 mA per one gram of the active material for positive electrode. Then, the batteries were charged and allowed to discharge at the same current value (discharge termination voltage: 1.5 V) to examine the discharge capacity per one gram of the active material for positive electrode under a low current load. Then, the batteries were charged in the same manner as above and then allowed to discharge at a current value corresponding to 300 mA per one gram of the active material for positive electrode so as to examine a change in discharge capacity when the load became larger. The results are shown in Table 5.

TABLE 5

|  | Active Material for Positive Electrode | Conductive Polymer | Discharge Capacity (mAh/g) | |
|---|---|---|---|---|
|  |  |  | Low Load | High Load |
| Example 17 | $(CS_{0.9})_n$ | Polyaniline | 553 | 481 |
|  | $(CS_{1.02})_n$ | Polyaniline | 606 | 558 |
|  | $(CS_{1.06})_n$ | Polyaniline | 613 | 553 |
|  | $(CS_{1.38})_n$ | Polyaniline | 493 | 414 |
| Example 18 | $(CS_{1.06})_n$ | Polypyrrole | 612 | 569 |
| Example 19 | $(CS_{1.06})_n$ | Polyaniline | 624 | 554 |
| Example 20 | $(CS_{1.06})_n$ | None | 610 | 336 |

As can be seen from the results of Table 5, by containing the conductive polymer in the positive electrode, it becomes possible to obtain a battery which shows a small decrease in discharge capacity even when the current value in the course of discharge becomes larger and which is suitable for use under a large current load.

EFFECT OF THE INVENTION

As described above, the present invention provides a carbon polysulfide which is highly useful particularly as an active material for nonaqueous electrolytic batteries. That is, a highly reliable nonaqueous electrolytic secondary battery which has a high capacity and shows a small decrease in the capacity in association with cyclic charge and discharge can be provided using, as an active material, a carbon polysulfide of the present invention which contains at least 67 wt. % of sulfur and at least 95 wt. % of carbon and sulfur in total, and also has the above specified physical properties.

What is claimed is:

1. A non-aqueous electrolytic battery comprising an active material, and a non-aqueous electrolyte;

wherein the active material is polycarbon sulfide comprising carbon and sulfur as constitutive elements and containing at least 67 wt. % of sulfur and at least 95 wt. % of carbon and sulfur in total, wherein a main peak appears at or around 1444 cm$^{-1}$ of a Raman shift and substantial only one peak appears at or around 490 cm$^{-1}$ within a range of 400 cm$^{-1}$ to 525 cm$^{-1}$;

wherein the battery further comprises at least one compound selected from the group consisting of organic sulfur compounds, other than the polycarbon sulfide, compounds having a structure represented by the formula: —$S_y$— ($y \geq 3$), lithium sulfides and sulfur;

wherein a lithium sulfide is contained in the positive electrode or the electrolyte.

2. The non-aqueous electrolytic battery according to claim 1, wherein said lithium sulfide is a compound represented by the formula: $Li_2S_t$ ($t \geq 2$).

* * * * *